Feb. 19, 1929.
A. R. RUTTER ET AL
1,702,416
ELECTRICAL MEASURING INSTRUMENT
Filed June 10, 1927
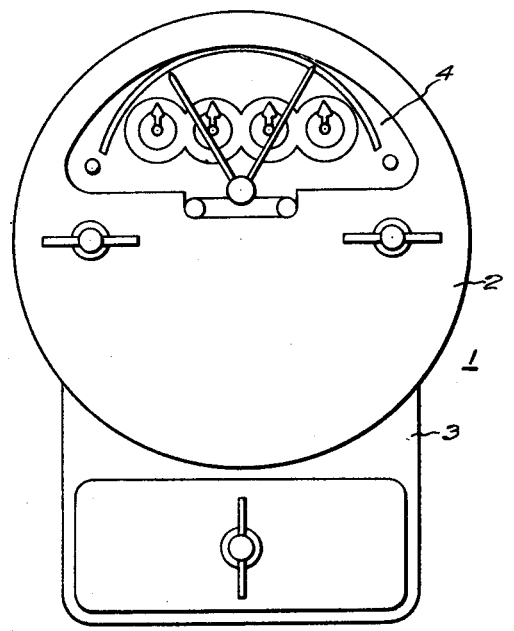
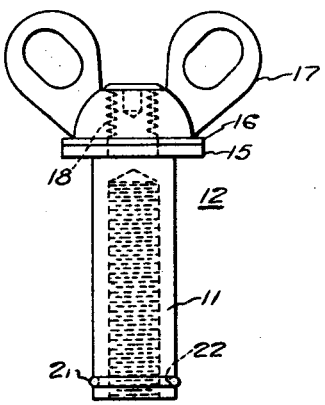
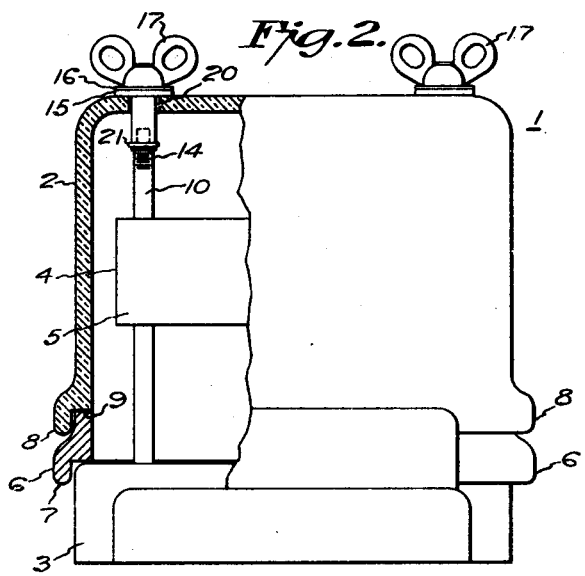
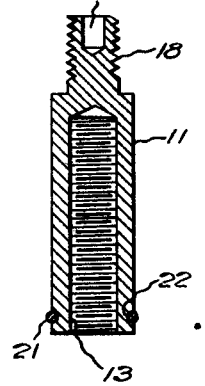
INVENTORS
Argyle R. Rutter and
Walter G. Mylius
BY
ATTORNEY Patented Feb. 19, 1929.

1,702,416

UNITED STATES PATENT OFFICE.

ARGYLE R. RUTTER AND WALTER G. MYLIUS, OF WILKINSBURG, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

Application filed June 10, 1927. Serial No. 197,828.

Our invention relates to electrical measuring instruments embodying meter mechanisms supporting bases and enclosing casings or covers.

Our invention resides in means for maintaining the cover or casing of an electrical measuring instrument in cooperative relation with a base member in such manner that an unauthorized person may not readily insert a wire or other small instrument into such cover or casing to affect the operation or rotation of the measuring mechanism. Other characteristics of our apparatus are its extreme simplicity, ease of manufacture, and the employment of standard meter parts.

It is further characteristic of our invention that a connecting member is employed for securing the cover to the base member and that said connecting member is suitably retained against casual displacement from its proper opening in the cover.

It is further characteristic of our invention that a wing nut or the like is utilized for holding the cover member to the base and that a resilient washer is utilized for properly distributing the pressure exerted by the connecting member on the cover.

Our invention resides in the apparatus and features of construction of the character hereinafter described and claimed, the foregoing and further characteristics of our invention being determinable from the following description.

For an illustration of one of the many forms our apparatus may take, reference is to be had to the accompanying drawing, in which:

Figure 1 is a view, in front elevation, of an electrical measuring instrument, having a cover secured in position in accordance with our invention, Fig. 2 is an elevational view, partly in section, of the electrical measuring instrument shown in Fig. 1, Fig. 3 is an enlarged elevational view of a connecting member constructed in accordance with our invention, and Fig. 4 is a view, in section, of a stud member constituting a part of the connecting member shown in Fig. 4.

In Figs. 1 and 2 is illustrated an electric measuring instrument and, more specifically, a maximum-demand meter 1 provided with a cover 2 for enclosing the metering mechanism 4 that is secured to a base 3 in proper assembled relation. Only a portion of the meter mechanism 4 is shown, that portion in Fig. 2 being an elevation of a drag magnet 5 that operates to dampen the rotation of the disk (not shown) of the maximum-demand meter 1.

In accordance with our invention, standard parts of a watthour meter are utilized in the construction of a maximum-demand meter, and, to this end, we have evolved a novel arrangement for securing the standard wing nuts ordinarily employed in watthour meters to the supporting standards or members extending from the base of the instrument.

In practicing our invention, we interpose a ring shaped member between the cover and the meter base, whereby the depth of the cover is increased sufficiently to permit the enclosure of the additional mechanism necessary for causing a watthour meter to operate as a maximum-demand meter.

As shown in Fig. 2, the depth of the cover 2 is increased by a ring 6 provided with a projecting portion 7 similar to the projecting portion 8 of the lower portion of the cover 2. The dimensions of the ring 6 are such that the lower portion 8 of the cover 2 cooperates with the upper portion 9 of the ring member in a manner similar to the cooperation of the lower portion 8 of the cover 2 with the base of the meter 3.

The standard supporting members 10 employed in the construction of an ordinary watthour meter are made of a definite predetermined length, and it is a purpose of our invention to utilize such standard supporting members when securing the cover 2 to the base 3, even though the cover 2 has been spaced from the base 3 by the introduction of the auxiliary ring 6. For accomplishing this purpose, we provide an elongated member or stud 11 that is adapted to form the main part of a connecting member 12 which holds the cover 2 in assembled relation to the base 3.

The stud 11 may consist of any suitably shaped connected member but we prefer that it shall comprise an interiorly threaded inner portion 13 for engagement with the threaded portion 14 of the supporting member 10. The cross-sectional area of the upper portion of the stud 11 is decreased, as illustrated in Fig. 4, for the reception of a resilient washer 15 and a relatively stiff washer 16. A wing nut 17, of a standard size and having a threaded inner portion, is secured to the upper threaded portion 18 of the stud 11, said threaded portion 18 being provided with a cored-out portion 19, the upper rim of which (Figs. 3 and 4) is spun over the top of the wing nut 17 after the various parts have been assembled on stud 11. As a result of the spinning operation, the wing nut 17 and the stud 11 are formed into a unitary mechanical structure so that the connecting member 12 may be secured to the supporting member 10 upon rotation of the wing nut 17.

The wing nut 17, or equivalent, may be secured to the stud 11 in any suitable manner but we prefer that it be secured as outlined above, making it approximately as solid as if made from a single piece.

The washers 15 and 16 may be of any suitable material, but, in accordance with our invention, we prefer that the resilient washer 15 shall be of a material, such as felt, and that it shall be supported by washer 16 that is of a relatively stiff material, such as steel.

In order that the connecting members 12 shall be retained in the cover 2 when the latter is removed from the base 3 and the studs 10, we provide means for preventing the stud 11 from slipping through the openings 20 in the cover 2. Any suitable means may be used to accomplish this purpose, such as a removable resilient ring 21 that is held in place by its cooperation with a circumferential slot 22 in stud 11.

We claim as our invention:

1. The combination with a base on which meter mechanism is supported, of a cover for said meter mechanism carried by said base, and means for securing said cover to said base comprising a member projecting from said base and terminating interiorly of said cover, and a connecting member interposed between said cover and said projecting member, said connecting member having means associated therewith for retention thereof in said cover.

2. The combination with a base on which meter mechanism is supported, of a cover for said meter mechanism carried by said base comprising a member projecting from said base and terminating interiorly of said cover and a connecting member interposed between said cover and said projecting member, said connecting member comprising a stud, a wing nut secured to said stud, a resilient washer for separating said wing nut and said cover and a removable ring mounted on said stud for retaining said stud in said cover.

3. A device for co-operation with a supporting member and a cover having an opening, said device comprising an elongated member extending through said opening and engaging said supporting member, a wing nut secured to said elongated member and means forming a resilient contact between said cover and said wing nut, said means being permanently secured to said elongated member by said wing nut.

4. A meter casing, a cover therefor provided with an opening, a threaded bolt extending from said casing in line with said opening to a point within said cover, a connecting member on said bolt for holding said cover in place, said member comprising, a stud extending through the opening in said cover having a threaded outer portion, a wing nut for said member, a portion of said outer portion being spun over a portion of said wing nut, a resilient washer and a relatively stiff washer secured between said stud and said wing nut and a resilient ring mounted in an inset in said stud.

5. A meter structure, a cover therefor provided with an opening, a threaded bolt extending from said structure in line with said opening to a point within said cover, a device for holding said cover in place comprising an elongated member having a threaded portion engaging said threaded bolt, a wing nut threaded to an end portion of said member, said end portion being spun over a portion of said wing nut, and means for transmitting pressure from said wing nut to the other of said related members including a felt washer supported by a relatively stiff washer, said washers being secured to said elongated member by said wing nut.

In testimony whereof, we have hereunto subscribed our names this 2nd day of June, 1927.

ARGYLE R. RUTTER.
WALTER G. MYLIUS.